(12) United States Patent
Agarwal

(10) Patent No.: US 9,036,468 B1
(45) Date of Patent: May 19, 2015

(54) FLOW CONGESTION MANAGEMENT

(75) Inventor: Anil Agarwal, North Potomoc, MD (US)

(73) Assignee: ViaSat, Inc., Carlsbad, CA (US)

( * ) Notice: Subject to any disclaimer, the term of this patent is extended or adjusted under 35 U.S.C. 154(b) by 859 days.

(21) Appl. No.: 12/835,350

(22) Filed: Jul. 13, 2010

Related U.S. Application Data

(60) Provisional application No. 61/225,265, filed on Jul. 14, 2009.

(51) Int. Cl.
*H04L 12/823* (2013.01)
(52) U.S. Cl.
CPC ........................................ *H04L 47/32* (2013.01)
(58) Field of Classification Search
CPC ........................................................ H04L 47/32
USPC ........................................................... 370/230
See application file for complete search history.

(56) References Cited

U.S. PATENT DOCUMENTS

| | | | | |
|---|---|---|---|---|
| 4,769,811 A | * | 9/1988 | Eckberg et al. | 370/236 |
| 6,377,546 B1 | * | 4/2002 | Guerin et al. | 370/230 |
| 6,885,675 B1 | * | 4/2005 | Gibbings | 370/433 |
| 7,782,774 B2 | * | 8/2010 | Cheriton | 370/232 |
| 2004/0081093 A1 | * | 4/2004 | Haddock et al. | 370/230 |
| 2004/0202163 A1 | * | 10/2004 | Lee | 370/390 |
| 2006/0078008 A1 | * | 4/2006 | Bordonaro et al. | 370/522 |
| 2006/0133279 A1 | * | 6/2006 | Le Faucheur et al. | 370/235 |
| 2007/0121505 A1 | * | 5/2007 | Ansari et al. | 370/230 |

* cited by examiner

*Primary Examiner* — Luat Phung
(74) *Attorney, Agent, or Firm* — Holland & Hart LLP

(57) ABSTRACT

Systems, methods, and devices are described for flow congestion management. A series of packets may be received at a routing or other device. A group of active flows may be identified from the received series of packets. A determination may be made that the measured rate associated with the group of active flows exceeds a blocking threshold. Flows to be blocked may be selected using a blocking criteria. Packets associated with the blocked flows may then be discarded, while packets of unblocked flows may be forwarded for distribution. The rate for the group may be monitored, and flows may be selected for unblocking using unblocking criteria.

28 Claims, 8 Drawing Sheets

US 9,036,468 B1

FLOW CONGESTION MANAGEMENT

CROSS-REFERENCES TO RELATED APPLICATIONS

This application claims priority from U.S. Provisional Patent Application No. 61/225,265, filed Jul. 14, 2009, entitled "FLOW CONGESTION MANAGEMENT", which is hereby incorporated by reference, as if set forth in full in this document, for all purposes.

BACKGROUND

The present invention relates to communications in general and, in particular, to flow congestion management.

In a typical router interface architecture, packets are received and placed in queues. Queue selection is often done based on packet type (e.g., by inspecting a DiffServ Code Point or Layer 2 Priority field, or transport protocol port numbers). In many implementations, there is one queue per service type (voice, video, preferred data, best effort data, etc.). Various packet scheduler types (e.g., self-clocked fair queueing (SCFQ), weighted round-robin (WRR), weighted fair queueing (WFQ), or strict priority scheduling (SPS)) may be used to schedule packets from queues and provide quality of service to different queues. Packets for specific queues may be discarded if rate exceeds configured limit for the queues.

Congestion can occur because of too many active flows or because of a reduction in system capacity (such as in wireless and satellite systems using adaptive coding and modulation (ACM)). Typically, congestion management is done by managing queues (e.g., tail-drop—discard packet if queue is full; random early discard (RED)—randomly discard packet if queue is close to full). These techniques may be adequate for many data applications, but less so for flow-based applications such as voice and video. By way of example, when there are different flows (e.g., voice calls) that share the queue, and total voice traffic exceeds queue capacity, then discarding packets across all flows may not be a good policy.

SUMMARY

Systems, methods, devices, and computer program products s are described for flow congestion management. A series of packets may be received at a routing or other device. A group of active flows may be identified from the received series of packets. A determination may be made that the measured rate associated with the group of active flows exceeds a blocking threshold. Flows to be blocked may be selected using a blocking criteria. Packets associated with the blocked flows may then be discarded, while packets of unblocked flows may be forwarded for distribution. The rate for the unblocked flows of the group may be measured and monitored on an ongoing basis, and blocked flows may be selected for unblocking using unblocking criteria.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, methods, and devices are described for flow congestion management. A series of packets may be received at a router or other device. A group of active flows may be identified from the received series of packets. For example, a group of active voice calls may be identified. A determination may be made that the measured rate associated with the group of active flows exceeds a blocking threshold, indicating congestion. By applying blocking criteria, flows to be blocked may be selected. Packets associated with the blocked flows may then be discarded, while packets of unblocked flows may be forwarded for distribution. The rate for the unblocked flows of the group may be measured and monitored on an ongoing basis, and additional flows may be blocked. Blocked flows may be selected for unblocking using unblocking criteria.

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain examples may be combined.

It should also be appreciated that the following systems, methods, devices, and software may individually or collectively be components of a larger system, wherein other procedures may take precedence over or otherwise modify their application. Also, a number of steps may be required before, after, or concurrently with the following examples.

Figure 1:
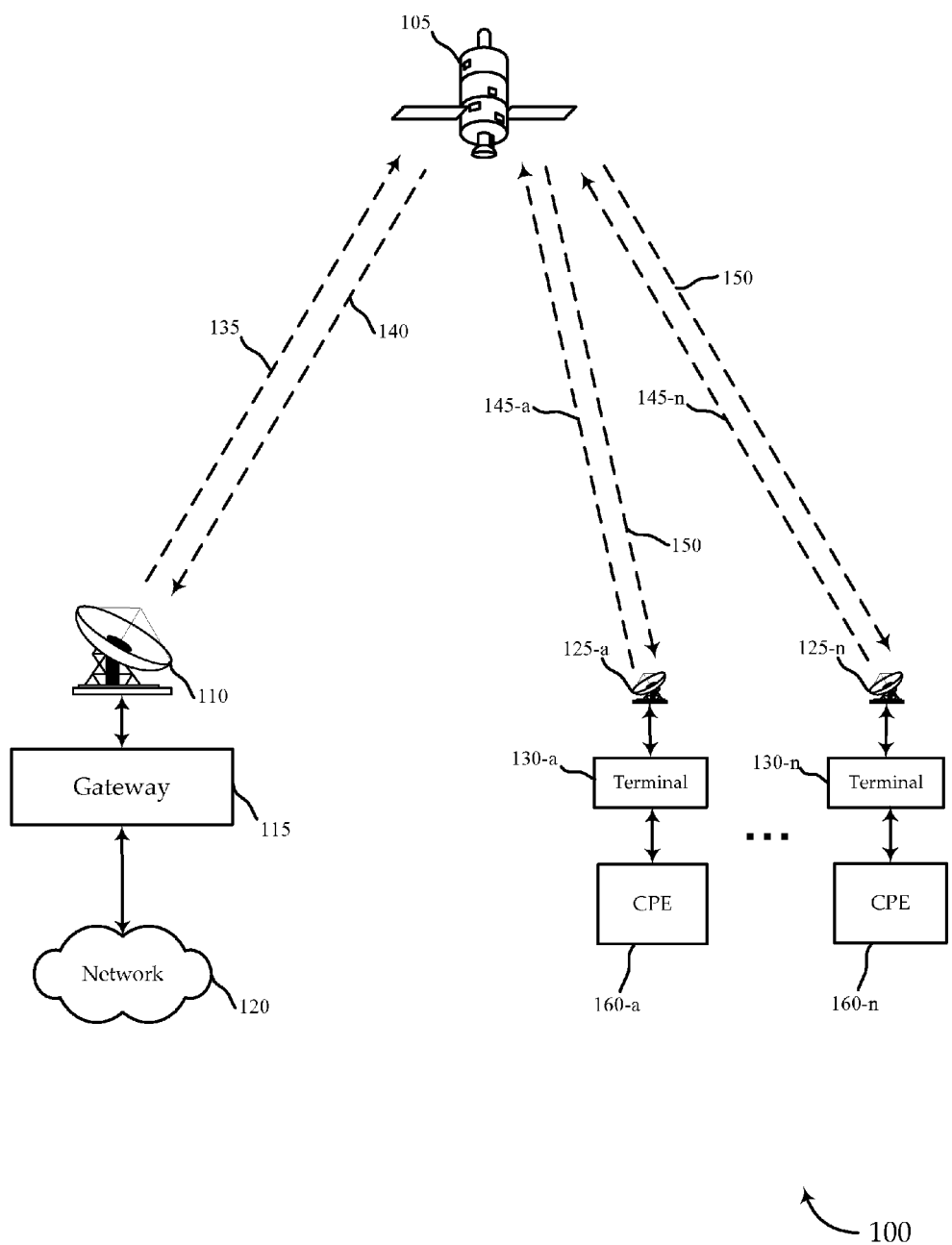
FIG. 1 is a block diagram illustrating an example of a satellite communications system configured according to various embodiments of the invention.

Referring first to FIG. 1, a block diagram illustrates an example satellite communications system 100. The satellite communications system 100 includes a network 120, such as the Internet, interfaced with a gateway 115 that is configured to communicate with one or more terminals 130, via a satellite 105. While a satellite communications system is used to illustrate various aspects of the invention, it is worth noting that the flow congestion principles set forth herein are applicable to a number of other wireless and other communications systems, as well. For example, the flow congestion management principles may be implemented in a variety of routers or switches, as will be addressed below.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network 120 may connect the gateway 115 with other gateways (not pictured), which are also in communication with the satellite 105, and which may share information on link conditions and other network metrics.

The gateway 115 provides an interface between the network 120 and the terminals 130. The gateway 115 may be configured to receive data and information directed to one or more terminals 130, and format the data and information for delivery downstream to the respective terminals 130 via the satellite 105. The flow congestion principle discussed herein may, for example, be implemented at the gateway 115. Thus, the gateway 115 may receive a series of packets and identify a group of active flows (e.g., voice calls) from the received series of packets. The gateway 115 may determine that the measured rate associated with the group of active flows exceeds a blocking threshold. The gateway 115 may select the flows to be blocked using a blocking criteria. The gateway 115 may discard packets associated with the blocked flows, while packets of unblocked flows may be forwarded for distribution. The gateway 115 rate for the group may be monitored, and flows may be selected for unblocking using unblocking criteria.

The gateway 115 may also be configured to receive upstream signals from the satellite 105 (e.g., from one or more terminals 130) directed to a destination in the network 120, and format the received signals for transmission through the network 120.

A device (not shown) connected to the network 120 may, therefore, communicate with one or more terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the digital video broadcast—second generation (DVB-S2) and worldwide interoperability for microwave access (WiMAX) standards. The gateway 115 may use a broadcast signal, with a modulation and coding (modcode) format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time-division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more terminals 130. In one embodiment, the satellite 105 operates in a multi-beam mode, transmitting a number of narrow beams, each directed at a different region of the earth, allowing for frequency re-use. With such a multi-beam satellite 105, there may be any number of different signal switching configurations on the satellite 105, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art. The satellite 105 may use the flow congestion techniques described herein for downstream or upstream signals.

The service signals transmitted from the satellite 105 may be received by one or more terminals 130, via the respective antenna 125. In one embodiment, the antenna 125 and terminal 130 together make up a very small aperture terminal (VSAT). In other embodiments, a variety of other types of antennas 125 may be used at the terminal 130 to receive the signal from the satellite 105. Each of the terminals 130 may be a single user terminal or, alternatively, be a hub or router (not pictured) that is coupled with multiple user terminals. Each terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the terminals 130. In this embodiment, a number of frequency channels are allocated which may be fixed, or which may be allocated in a more dynamic fashion. A Time-Division Multiple Access (TDMA) scheme is then employed in each frequency channel. In this scheme, each frequency channel may be divided into several timeslots that can be assigned to a connection (i.e., a terminal 130). In other embodiments, one or more of the upstream links 140, 145 may be configured with other schemes, such as TDMA, FDMA, OFDMA, CDMA, or any number of hybrid or other schemes known in the art.

A terminal 130 may transmit packets to a gateway 115 via the satellite 105. The packets transmitted between the gateway 115 and terminals 130 may be for different traffic classes such as voice, video, and data, merely by way of example.

Figure 2:
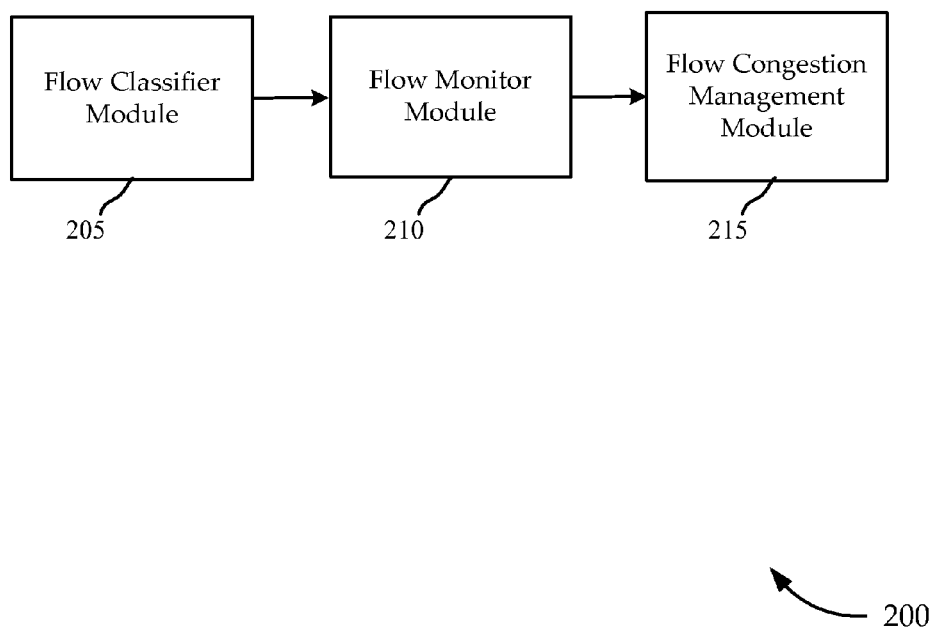
FIG. 2 is a simplified block diagram of a flow congestion management configuration according to various embodiments of the invention.

FIG. 2 is an example configuration 200 of a flow congestion system according to various embodiments of the invention. The configuration may be implemented, for example, in the gateway 115 of FIG. 1. Alternatively, it may be implemented in the satellite 105 of FIG. 1 (e.g., if there is a multi-beam satellite 105 that has on board processing capabilities). In other embodiments, the system may be implemented in any number of other wired, or wireless, communications systems to manage flow congestion (e.g., at a router or switch). The configuration 200 may be implemented in one, or more, devices that may be located in the same, or different, locations.

The configuration 200 includes a flow classifier module 205, a flow monitor module 210, and a flow congestion management module 215, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The flow classifier module 205 may identify a group of active flows from a series of received packets. This group may, for example, be the active voice calls directed toward a particular router interface with a finite amount of resources. The flow classifier module 205 may identify a certain type of packets (e.g., voice, or video), and then identify all active flows of that type directed to a particular interface as the "group" of active flows.

The flow monitor module 210 may measure the rate for each group of active flows. The flow monitor module 210 may determine whether a given group of active flows exceeds a blocking threshold. The flow monitor module 210 may set the threshold, and dynamically change the threshold is response to a variety of factors (e.g., the amount of traffic from various other traffic classes). The flow monitor module 210 may determine when the measured rate associated with the group of active flows exceeds a threshold.

The flow congestion management module 215 may select, in response to the threshold determination, flows to be blocked. The flow congestion management module 215 may use a variety of blocking criteria to identify the particular flows of the group to be blocked. The flow congestion management module 215 may discard packets of the blocked flows, while forwarding the packets of the unblocked flows (e.g., to a packet scheduler).

There are a number of blocking criteria that may be used in selecting a flow to be blocked. For example, there may be a preference to block a flow from a source exceeding a guaranteed rate. Flow may have different priority values, and there may be a preference to block flows with lower priority values. There may be a preference to block flows with a longest duration of traffic inactivity among the active flows of the group. There may also be a preference to block a multicast flow instead of a unicast flow. There may also be a preference to block the flows that have last, or more recently, transitioned from a blocked flow to an unblocked flow. Different weightings may be applied to the various blocking criteria. Upon selecting a flow to be blocked, the blocking threshold may be increased for a temporary period (e.g., to allow the blocking impact to take effect).

The flow congestion management module 215 may also unblock flows that have been previously blocked as traffic conditions change. For example, the flow congestion management module 215 may determine that a measured rate associated with the unblocked active flows of the group is less than an unblocking threshold. The flow congestion management module 215 may select blocked flows of the group to be unblocked. The unblocking threshold may be different than the blocking threshold (e.g., be set at a relatively lower rate) to avoid flip-flopping. Along these same lines, the unblocking criteria may be different from the blocking criteria.

There are a number of blocking criteria that may be used in selecting a blocked flow to be unblocked. For example, there may be a preference to unblock a flow based on priority values associated with the blocked flows within the group, or prefer a unicast flow to be unblocked instead of a multicast flow. There may be a preference to unblock a flow that has been in a blocked state for a longer duration than a remainder of blocked flows of the group. Different weightings may be applied to the various unblocking criteria. It is also worth noting that the blocking and unblocking thresholds may each be independently adjusted in a dynamic manner (e.g., in response to the measured rate).

Figure 3:
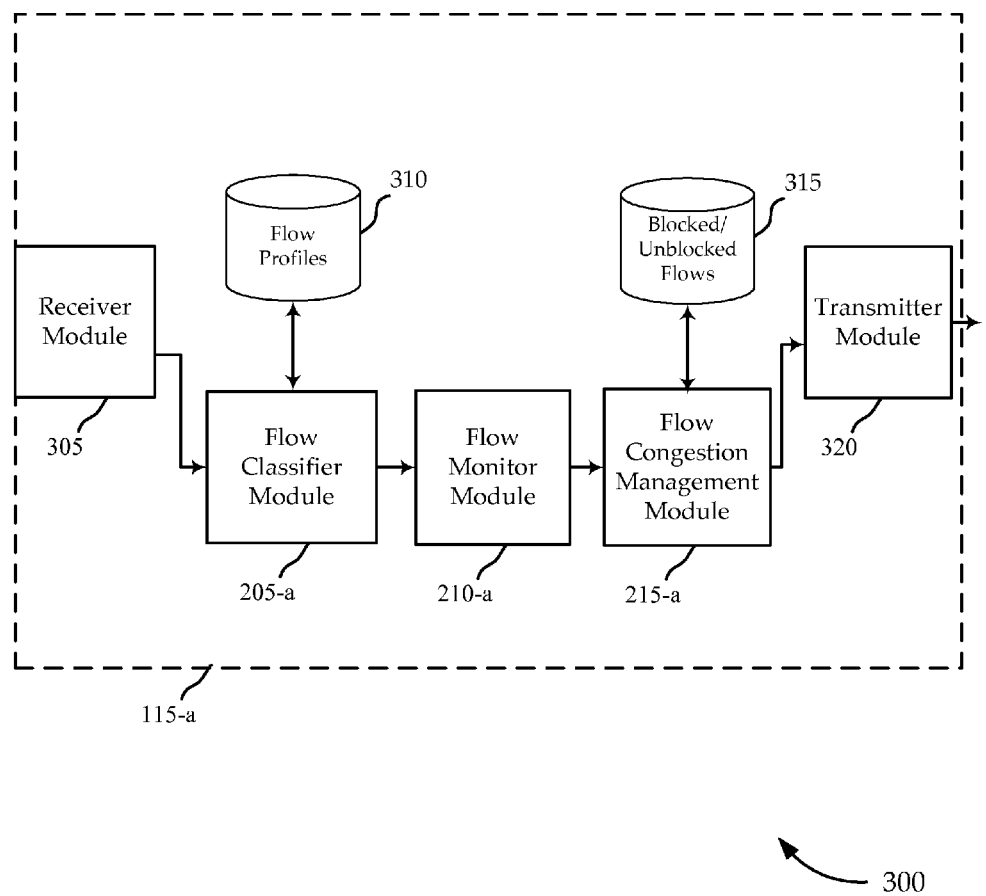
FIG. 3 is a simplified block diagram of a flow congestion management system configured according to various embodiments of the invention.

FIG. 3 is an example of a flow congestion system 300 according to various embodiments of the invention. The system 300 may be implemented, for example, in the gateway 115 or satellite 105 of FIG. 1, or in any number of other wired, or wireless, communications devices or systems to manage flow congestion (e.g., at a router or switch). The system 300 may be an implementation of the configuration 200 of FIG. 2.

The system 300 includes a receiver module 305, a flow classifier module 205-*a*, a flow profiles datastore 310, a flow monitor module 210-*a*, a flow congestion management module 215-*a*, a blocked/unblocked flows datastore 315, and a transmitter module 320. The system 300 may include, for example, one or more server computers, workstations, web servers, or other suitable computing devices. The system may be fully located within a single facility or distributed geographically, in which case a network may be used to integrate different components.

The datastores 310, 315 may be a single database, while in other embodiments, they may be made up of any number of separate and distinct databases. The datastores 310, 315 may include one, or more, relational databases or components of relational databases (e.g., tables), object databases, or components of object databases, spreadsheets, text files, internal software lists, or any other type of data structure suitable for storing data. Thus, it should be appreciated that datastores 310, 315 may be multiple data storages (of the same or different type), or may share a common data storage with other datastores. Although in some embodiments the datastores 310, 315 may be distinct from a flow congestion management system, in other embodiments they may be integrated therein to varying degrees.

The receiver module 305 may receive a series of packets from one or more sources, via one or more interfaces. The flow classifier module 205-*a* may evaluate a subset of the received packets of this series (e.g., the packets to be directed to an interface with finite resources). The flow classifier module 205-a may identify a set of active flows from the subset of packets.

Thus, the system 300 may detect and keep track of active flows using the flow classifier module 205-a. A flow may be defined by a unique combination of the following IP packet fields, or any subset or combination thereof:
- Source IP Address
- Destination IP address
- Protocol (e.g., UDP)
- DiffServ Code Point (DSCP)
- Protocol (e.g., UDP)
- Source Port number
- Destination Port Number
- Others Thus, a flow may be defined by a source IP address and a destination IP address, and in some cases by a source or destination port number and/or a protocol.

For each active flow, a data structure ("FlowInfo") may be maintained (e.g., with a flow profiles table in a flow profiles datastore 310) that contains any combination of the following fields:
- Source IP Address
- Destination IP address
- Protocol (e.g., UDP)
- DiffServ Code Point (DSCP)
- Protocol (e.g., UDP)
- Source Port number
- Destination Port Number
- IPv6 flow id
- Measured Data Rate
- Priority
- is Blocked (yes or no)
- LastUseTimeStamp
- LastActivationTimeStamp Flows may be grouped on a per-queue basis, and thus the system 300 may be implemented on a per-queue basis. Flows directed to a given interface may, for example, be grouped according to traffic type, traffic class, quality of service, or other metrics.

Whenever a new packet arrives, the following packet fields may be used by the flow classifier module 205-a to find an existing flow:
- Source IP Address
- Destination IP address
- Protocol (e.g., UDP)
- DiffServ Code Point (DSCP)
- Protocol (e.g., UDP)
- Source Port number
- Destination Port Number
- IPv6 flow id Note that other fields or derived information for the packet may also be used for flow classification (i.e., to identify the group a flow belongs to). If a FlowInfo is not found, then one may be created by the flow classifier module 205-a and stored in the flow profiles datastore 310.

If a flow is not used for a configurable amount of time (e.g., 5 minutes), then its FlowInfo may be deleted from the flow profiles datastore 310 table. A LastUseTimeStamp field may be used for this purpose. The flow profile datastore 310 may store a table identifying active flows, the active flows organized according to group (e.g., according to traffic class or quality of service metrics).

The flow monitor module 210-a may measure the rate for the group of active flows (e.g., for a given queue for a specified interface). This rate measurement may take any number of forms (e.g., measuring queue size). The flow monitor module 210-a may monitor the rate associated with the group, and determine whether the group of active flows exceeds a blocking threshold. The blocking threshold may be the rate allocated to the group (e.g., a rate allocated to a voice queue at an interface, less some buffer). The flow monitor module 210-a may determine when the measured rate associated with the group of active flows exceeds a threshold.

The flow congestion management module 215-a may select, in response to the threshold determination, flows to be blocked. The flow congestion management module 215-a may use a variety of blocking criteria to identify the particular flows of the group to be blocked. A number of different criteria, alone or in combination, may be used to select a flow for blockage (preemption):
1) Prefer to block a flow that has not been recently active;
2) Prefer to block a multicast flow instead of unicast flow;
3) Prefer to block flows of lower priority
   A flow might be assigned a priority, based on additional configuration information (e.g., flows from/to certain IP addresses may be assigned certain priority values);
4) Prefer to block a flow from source that is exceeding its guaranteed rate
   This rule may be applicable for edge routers or wireless/satellite systems that have information on sites and users and their configured guaranteed rates; and/or
5) Prefer to block a flow that was set to unblocked state most recently.

Additional rules may be used, as well.

A blocked flow may be changed to an unblocked state if congestion alleviates. If the measured rate decreases below an unblocking threshold, then a flow may be selected and changed to an unblocked state. A number of different criteria, alone or in combination, may be used to select a blocked flow for unblocking (restoration):
1) Prefer to unblock flows that have been in blocked state for more than a set period (e.g., 30 seconds);
2) Prefer to unblock unicast flows over multicast flows;
3) Prefer to unblock flows with higher priority; and/or
4) Prefer to keep flows in a blocked state that were set to the blocked state most recently.

Note that if a flow restoration results in congestion, it may be preferentially blocked again by the flow selection rules (e.g., see unblocking criteria 4).

Figure 4:
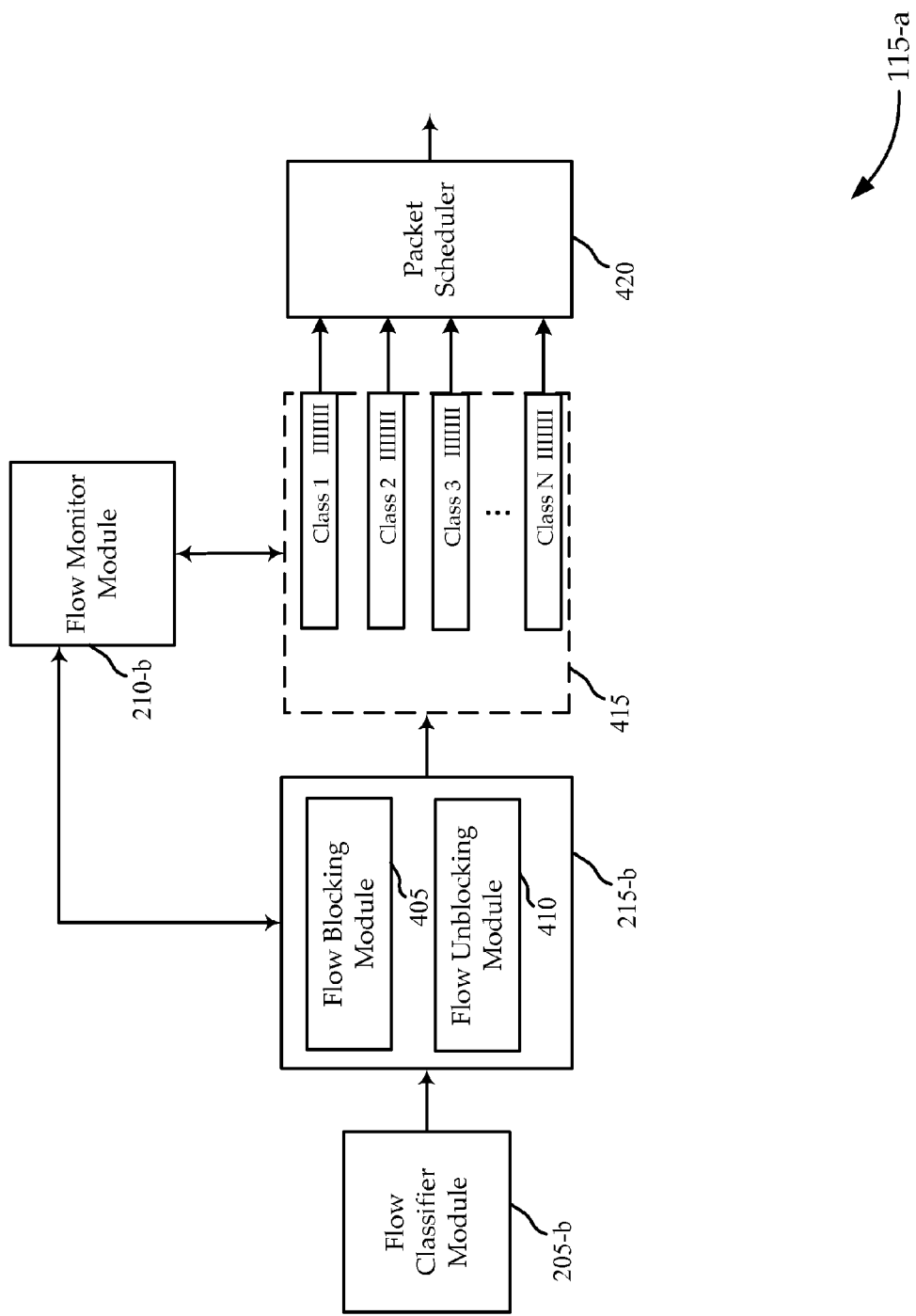
FIG. 4 is a simplified block diagram of a flow congestion system for a series of queues according to various embodiments of the invention.

FIG. 4 is an example of a gateway 115-a according to various embodiments of the invention. The specific configuration illustrated in the gateway 115-a may be implemented, for example, in any number of other wired, or wireless, communications devices or systems to manage flow congestion. The gateway 115-a may be an implementation of the configuration 200 of FIG. 2 or system 300 of FIG. 3. The gateway 115-a includes a flow classifier module 205-b, flow monitor module 210-b, flow congestion management module 215-b, a number of queues 415, and a packet scheduler 420. The flow congestion management module 215-b includes a flow blocking module 405 and flow unblocking module 410.

The gateway 115-a illustrates an example of a system for flow-based congestion control that may be implemented on a per-queue basis. When congestion occurs for a given queue, an active flow is selected to be blocked. Thereafter, all (or a set portion) of the packets for this flow may be discarded until the flow is unblocked.

The flow classifier module 205-b may identify active flows for each queue 415 from a series of received packets. A queue 415 may, for example, be the active voice calls directed toward a particular router interface with a finite amount of resources. The flow classifier module 205-*b* may identify active flows for each queue 415 directed to a particular interface.

The flow monitor module 210-*b* may measure a rate for each queue 415 at an interface (e.g., assessing current average queue size (avgQueueSize)). Average queue size may be compared to a threshold T. Average queue size may be computed in a similar manner to that used by the RED algorithm. The threshold T may be configured with value T0 at startup and may change dynamically thereafter. Alternatively, current instantaneous queue size may be used. Queue size and threshold T may be kept in units of packets or bytes.

The flow blocking module 405 may select, in response to a determination that a queue size is greater than T, flows to be blocked. The flow blocking module 405 may use a variety of blocking criteria to identify the particular flows of the group to be blocked (e.g., any of the flow blocking criteria addressed above. The flow blocking module 405 may discard packets of the blocked flows, while forwarding the packets of the unblocked flows to the queues 415 before they are forwarded to packet scheduler 420). The flow blocking module 405 may function as follows:
If avgQueueSize≤T then the packet is queued.
Otherwise, an existing FlowInfo in an unblocked state is selected for blocking
If the current packet belongs to this selected flow, then it is discarded; otherwise it is queued.

The flow unblocking module 410 may also unblock flows that have been previously blocked as traffic conditions change. For example, if the average queue size decreases below T1 (a configurable parameter), then a flow may be selected and changed to an unblocked state.

For queues that support Drop Precedence markings and carry non-real-time traffic, in one example only packets with Drop Precedence=0 are used in determining avgQueueSize in some embodiments. For such queues, flows are allowed to exceed their minimum guaranteed rate; packets that exceed this rate are marked with non-zero Drop Precedence. Such packets may then be allowed to be discarded (using WRED), which can help avoid flow blockage when flows exceed the minimum guaranteed rate.

There are a number of options. In one example, threshold value T may be increased by the number of flows N in an unblocked state. This may allow the effect of the blocked flow to take effect and queue size to decrease, before another flow is selected for blockage. If T units are packets, then T may be increased by N; otherwise it may be increased by N times the average packet size. Whenever a packet is queued, T is decremented to no less than T0. If T units are packets, then it is decremented by 1; otherwise it is decremented by the packet size.

One method for congestion detection uses data rates: the average data rate for each flow may be measured dynamically, and if the sum of the data rates across all unblocked flows is >x*maxQueueRate, then congestion is assumed (e.g., x=0.95). Subsequently, congestion is declared over when the sum of the data rates across all unblocked flows is <y*maxQueueRate (e.g., y=0.90).

ECN is a technique that may be used by for sending congestion information to source protocols (indirectly via the destination), although ECN is generally not used for real-time traffic. With the systems described above with reference to FIGS. 2-4, ECN can be used to indicate that a flow has been blocked. Source protocols may then set the ECN-capable bit in the IP header. If a flow is blocked and the flow is ECN-capable, then flow control system 200 does not discard all packets for the flow; instead, every Nth packet for the flow is forwarded with the ECN flag set (N may be configurable, e.g., N=20). The destination can detect the ECN flag and send an indication to the source protocol that the ECN flag was detected, and the flow can be disconnected at the source.

The systems described above with reference to FIGS. 2-4 can work in conjunction with Flow Admission Control (FAC). FAC may reject flows based on explicit signaling and knowledge of flows and their parameters. If FAC is used, it may be configured to use a larger proportion of bandwidth than it normally would. The flow control systems described herein may help admit more calls, especially when link bandwidth is variable and when flows have a certain probability of being idle (i.e., not carrying traffic). The blocking of calls may be indicated to FAC, which can subsequently tear down flows.

The flow control system of FIG. 2, 3, or 4, and, more specifically, the flow classifier module 205, the flow monitor module, and/or the flow congestion management module 215 of FIG. 2, 3, or 4 may, individually or collectively, be implemented with one or more Application Specific Integrated Circuits (ASICs) adapted to perform some or all of the applicable functions in hardware. Alternatively, the functions may be performed by one or more other processing units (or cores), on one or more other integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 5:
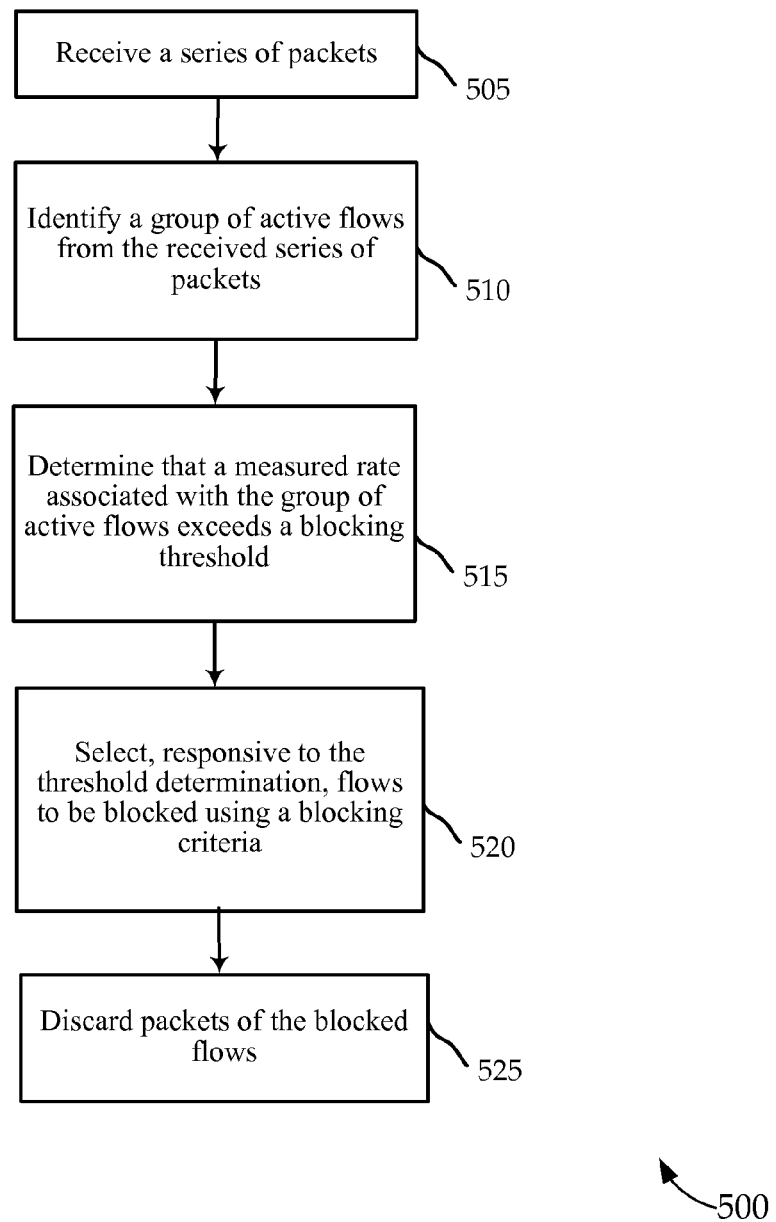
FIG. 5 is a flowchart illustrating a method of flow congestion management according to various embodiments of the invention.

FIG. 5 is a flowchart illustrating a method 500 of flow control according to various embodiments of the invention. The method 500 may, for example, be performed by the gateway 115 or the satellite 105 of FIG. 1, or any combination thereof. More specifically, the method 500 may be performed by flow control system 200, 300, or 400 of FIG. 2, 3, or 4. The flow classifier module 205, the flow monitor module 210, and/or the flow congestion management module 215 of FIG. 2, 3 or 4 may, individually or collectively, perform the steps of method 500.

At block 505, a series of packets is received. At block 510, a group of active flows from the received series of packets is identified. At block 515, a determination is made that a measured rate associated with the group of active flows exceeds a blocking threshold. At block 520, responsive to the threshold determination, flows to be blocked are selected using a blocking criteria. At block 525, packets of the blocked flows are discarded.

Figure 6:
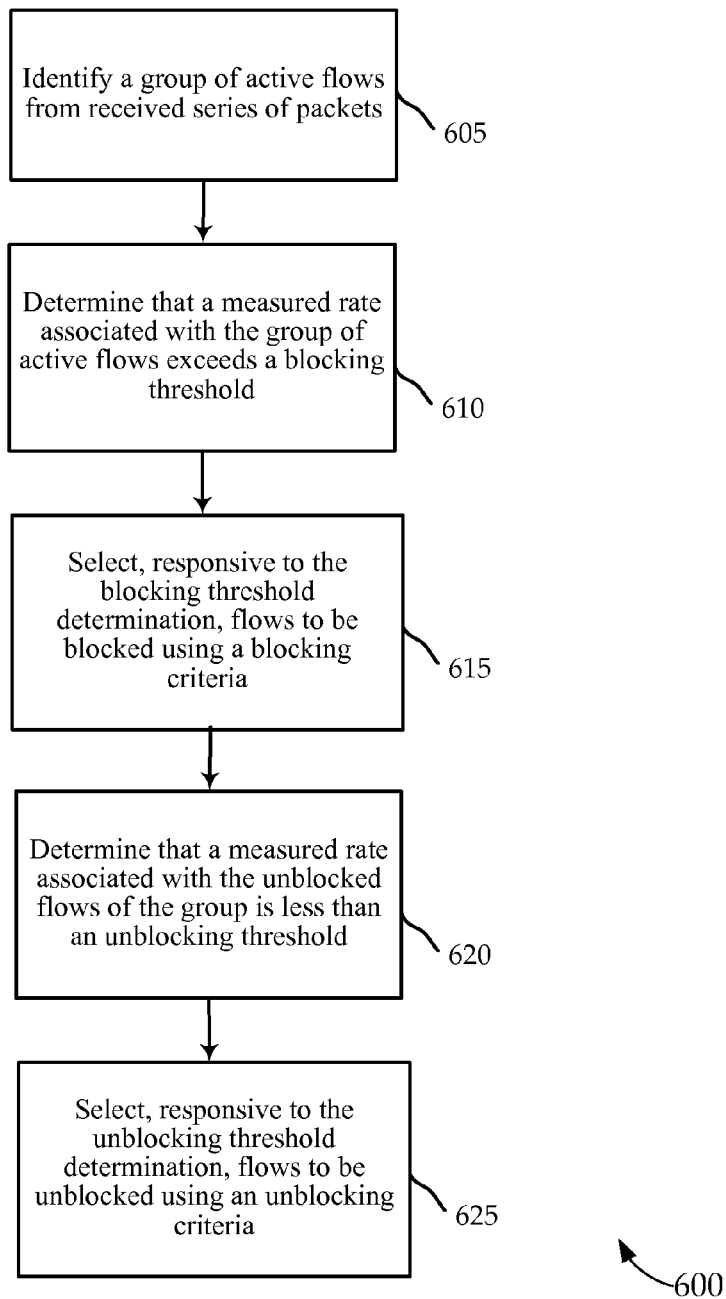
FIG. 6 is a flowchart illustrating a method of flow congestion management using flow blocking and unblocking techniques according to various embodiments of the invention.

FIG. 6 is a flowchart illustrating a method 600 of blocking and unblocking flows according to various embodiments of the invention. The method 600 may, for example, be performed by the gateway 115 or the satellite 105 of FIG. 1, or any combination thereof. More specifically, the method 600 may be performed by the flow control system of FIG. 2, 3, or 4. The flow classifier module 205, the flow monitor module 210, and/or the flow congestion management module 215 of FIG. 2, 3 or 4 may, individually or collectively, perform the steps of method 600.

At block 605, a group of active flows is identified from a received series of packets. At block 610, a determination is made that a measured rate associated with the group of active flows exceeds a blocking threshold. At block 615, in response to the blocking threshold determination, flows to be blocked are selected using a blocking criteria. At block 620, a determination is made that a measured rate associated with the unblocked flows of the group is less than an unblocking threshold. At block 625, in response to the unblocking threshold determination, flows to be unblocked are selected using an unblocking criteria.

Figure 7:
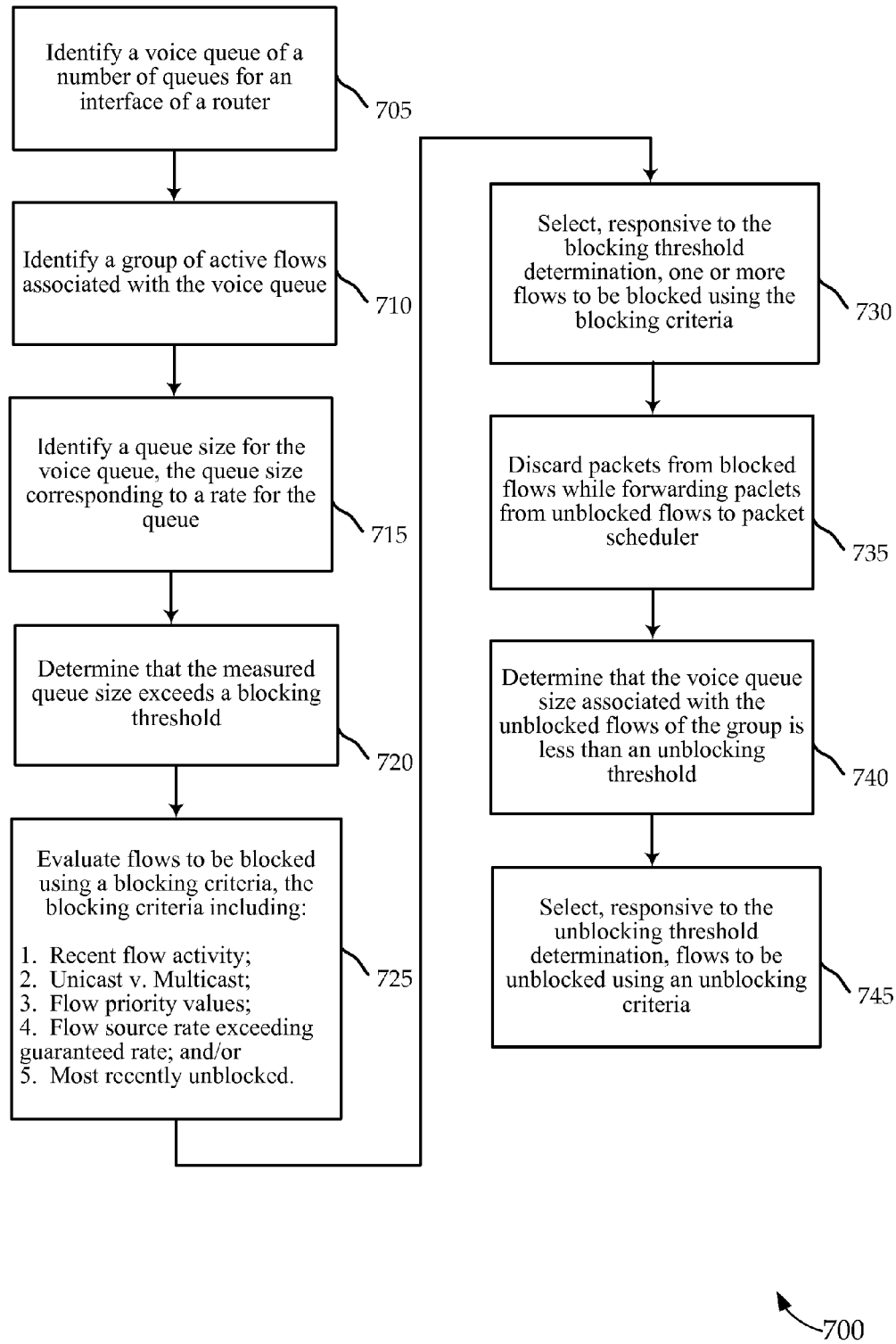
FIG. 7 is a flowchart illustrating a method of flow congestion management for a voice queue according to various embodiments of the invention.

FIG. 7 is a flowchart illustrating a method 700 of blocking and unblocking flows for a voice queue according to various embodiments of the invention. The method 700 may, for example, be performed by the gateway 115 or the satellite 105 of FIG. 1, or any combination thereof. More specifically, the method 700 may be performed by the flow control system of FIG. 2, 3, or 4. The flow classifier module 205, the flow monitor module 210, and/or the flow congestion management module 215 of FIG. 2, 3 or 4 may, individually or collectively, perform the steps of method 700.

At block 705, a voice queue of a number of queues is identified for an interface of a router. At block 710, a group of active flows associated with the voice queue is identified. At block 715, a queue size for the voice queue is identified, the queue size corresponding to a rate for the queue. At block 720, a determination is made that the measured queue size exceeds a blocking threshold.

At block 725, flows to be blocked are evaluated using a blocking criteria, the blocking criteria including: 1) recent flow activity; 2) unicast v. multicast; 3) flow priority values; 4) flow source rate exceeding guaranteed rate; and/or 5) last unblocked. At block 730, in response to the blocking threshold determination, one or more flows are selected to be blocked using the blocking criteria. At block 735, packets from blocked flows are discarded while forwarding packets from unblocked flows to the packet scheduler. At block 740, a determination is made that the voice queue size associated with the unblocked flows of the group is less than an unblocking threshold. At block 745, in response to the unblocking threshold determination, flows to be unblocked are selected using an unblocking criteria.

Figure 8:
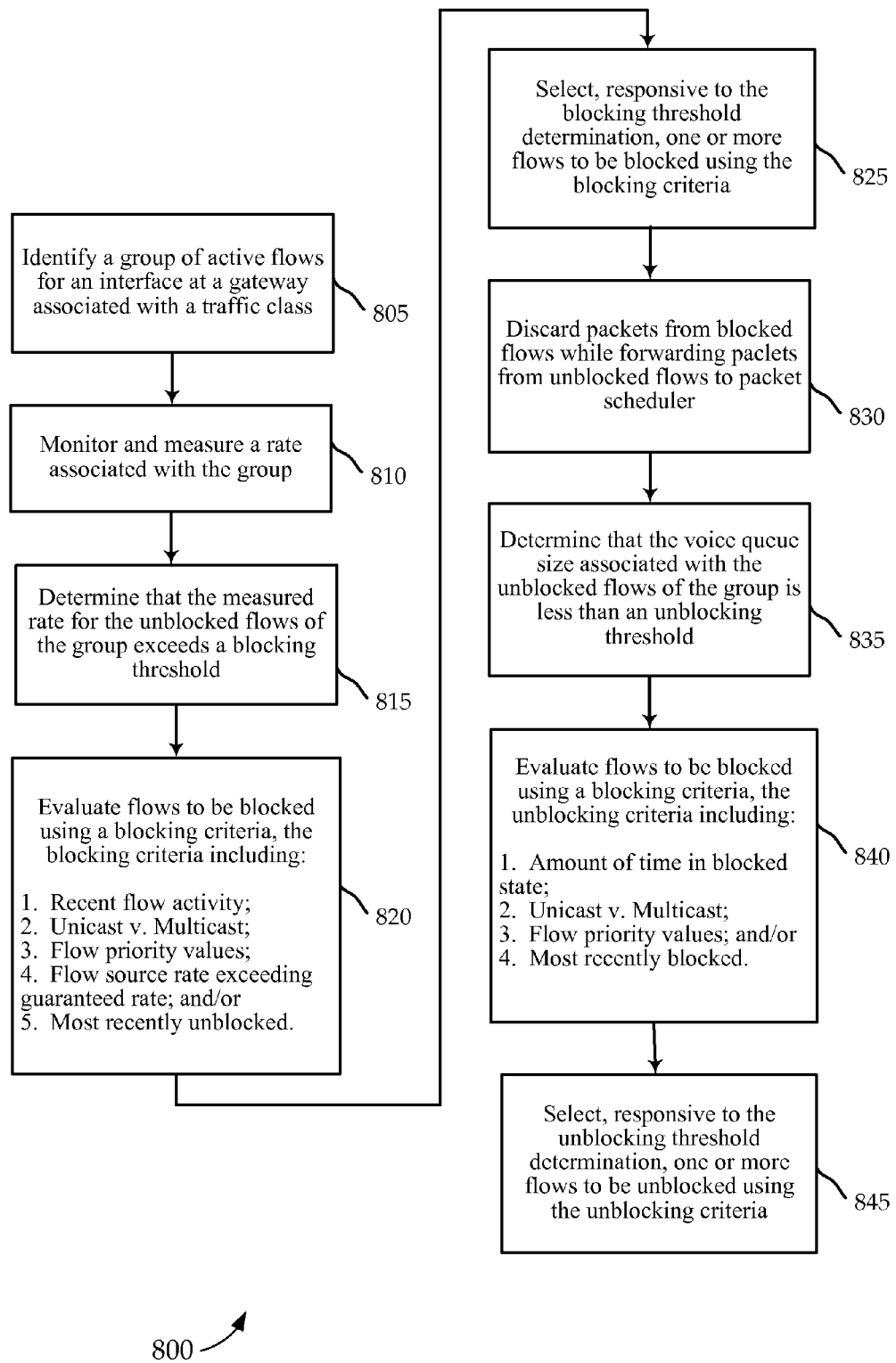
FIG. 8 is a flowchart illustrating an alternative method of flow congestion management according to various embodiments of the invention.

FIG. 8 is a flowchart illustrating a method 800 of blocking and unblocking flows using a range of criteria according to various embodiments of the invention. The method 800 may, for example, be performed by the gateway 115 of FIG. 1. More specifically, the method 800 may be performed by the flow control system of FIG. 2, 3, or 4. The flow classifier module 205, the flow monitor module 210, and/or the flow congestion management module 215 of FIG. 2, 3 or 4 may, individually or collectively, perform the steps of method 800.

At block 805, a group of active flows associated with a traffic class for an interface at a gateway is identified. At block 810, a rate associated with the group is monitored and measured. At block 815, a determination is made that the measured rate for the unblocked flows of the group exceeds a blocking threshold. At block 820, flows to be blocked are evaluated using a blocking criteria, the blocking criteria including: 1) recent flow activity; 2) unicast v. multicast; 3) flow priority values; 4) flow source rate exceeding guaranteed rate; and/or 5) last unblocked. At block 825, one or more flows to be blocked is selected using the blocking criteria responsive to the blocking threshold determination. At block 830, packets from blocked flows are discarded while forwarding packets from unblocked flows to the packet scheduler.

At block 835, a determination is made that the voice queue size associated with the unblocked flows of the group is less than an unblocking threshold. At block 840, flows to be blocked are evaluated using a blocking criteria, the unblocking criteria including: 1) amount of time in blocked state; 2) unicast v. multicast; 3) flow priority values; and/or 4) last blocked. At block 845, one or more flows to be unblocked are selected using the unblocking criteria responsive to the unblocking threshold determination.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for flow congestion management comprising:
    receiving a plurality of packets, the plurality of packets including packet fields;
    identifying a plurality of active flows from the received plurality of packets, each active flow associated with a flow profile comprising a plurality of the packet fields, wherein at least a first active flow is dynamically generated based on determining that packet fields of at least one packet of the plurality of packets do not correspond with flow profiles of existing active flows, the first active flow associated with a first flow profile comprising a first subset of the packet fields, and wherein at least a second flow profile associated with a second active flow comprises a second subset of the packet fields different than the first subset of packet fields;

identifying a group of active flows from the plurality of active flows based on the flow profiles, the group of active flows including the first active flow and the second active flow;

determining that a measured rate associated with the group of active flows exceeds a blocking threshold;

selecting, responsive to the threshold determination, flows to be blocked of the group of active flows, the flows to be blocked including the first active flow, the selection made using a blocking criteria;

discarding packets of the blocked flows; and forwarding packets of the second active flow for transmission.

2. The method of claim 1, further comprising:
forwarding packets of unblocked flows for transmission.

3. The method of claim 1, wherein,
the group comprises the active flows associated with a queue of a plurality of queues at a routing device; and
the measured rate comprises a measured queue size.

4. The method of claim 1, wherein selecting flows to be blocked using blocking criteria comprises:
selecting a flow to be blocked based at least in part on whether the selected flow is from a source exceeding a guaranteed rate.

5. The method of claim 1, wherein selecting flows to be blocked using blocking criteria comprises:
selecting a flow to be blocked based at least in part on priority values associated with the active flows of the group.

6. The method of claim 1, wherein selecting flows to be blocked using blocking criteria comprises:
selecting a flow to be blocked with a longest duration of traffic inactivity among the active flows of the group.

7. The method of claim 1, wherein selecting flows to be blocked using blocking criteria comprises:
preferring a multicast flow to be blocked instead of a unicast flow.

8. The method of claim 1, wherein selecting flows to be blocked using blocking criteria comprises:
selecting a flow to be blocked based at least in part on when the selected flow last transitioned from a blocked flow to an unblocked flow.

9. The method of claim 1, wherein the first flow profile comprises at least a source IP address and a destination IP address.

10. The method of claim 9, wherein the first flow profile further comprises at least a destination port number and a protocol.

11. The method of claim 1, further comprising:
determining that a measured rate associated with unblocked active flows of the group is less than an unblocking threshold; and
selecting, responsive to the unblocking threshold determination, blocked flows of the group to be unblocked.

12. The method of claim 11, further comprising:
dynamically modifying the blocking threshold responsive to the measured rate; and
dynamically modifying the unblocking threshold responsive to the measured rate.

13. The method of claim 11, wherein,
the unblocking threshold is different than the blocking threshold; and
the selecting blocked flows of the group to be unblocked is performed using unblocking criteria different from the blocking criteria.

14. The method of claim 13, wherein the selecting flows to be unblocked using unblocking criteria comprises:
selecting a flow to be unblocked based at least in part on priority values associated with the blocked flows within the group; and
preferring a unicast flow to be unblocked instead of a multicast flow.

15. The method of claim 13, wherein the selecting flows to be unblocked using unblocking criteria comprises:
preferring flows for unblocking that have been in a blocked state for a longer duration than a remainder of flows of the group in the blocked state.

16. The method of claim 1, further comprising:
increasing the blocking threshold responsive to the selection of flows to be blocked.

17. A system for flow congestion management comprising:
a flow classifier module configured to:
identify a plurality of active flows from a received plurality of packets, the received plurality of packets including packet fields, each active flow associated with a flow profile comprising a plurality of the packet fields, wherein at least a first active flow is dynamically generated based on determining that packet fields of at least one packet of the plurality of packets do not correspond with flow profiles of existing active flows, the first active flow associated with a first flow profile comprising a first subset of the packet fields, and wherein at least a second flow profile associated with a second active flow comprises a second subset of the packet fields different than the first subset of packet fields; and
identify a group of active flows from the received plurality of active flows based on the flow profiles, the group of active flows including the first active flow and the second active flow;
a flow monitor module, communicatively coupled with the flow classifier, and configured to determine that a measured rate associated with the group of active flows exceeds a threshold; and
a flow congestion management module, communicatively coupled with the flow monitor module, and configured to:
select, responsive to the threshold determination, flows to be blocked of the group of active flows using blocking criteria, the flows to be blocked including the first active flow;
discard packets of the blocked flows; and
forward packets of the second active flow for transmission.

18. The system of claim 17, wherein the flow congestion management module is further configured to:
forward packets of unblocked flows to a packet scheduler.

19. The system of claim 17, wherein,
the group comprises a queue for voice data of a plurality of queues for an interface at a routing device;
the system comprises the routing device; and
the measured rate comprises a measured queue size.

20. The system of claim 17, wherein the flow congestion management module, in selecting flows to be blocked using blocking criteria, is configured to:

select a flow to be blocked based at least in part on priority values associated with the flow and on a determination that the flow is from a source exceeding a guaranteed rate.

21. The system of claim 17, wherein the flow congestion management module, in selecting flows to be blocked using blocking criteria, is configured to:

select a flow to be blocked with a longest duration of traffic inactivity among the active flows of the group.

22. The system of claim 17, wherein the flow congestion management module, in selecting flows to be blocked using blocking criteria, is configured to:

select a flow to be blocked with a shortest duration, among the active flows of the group, since the selected flow last transitioned from a blocked flow to an unblocked flow.

23. The system of claim 17, wherein the first flow profile comprises at least a source address, a destination address, a port number, and a protocol.

24. The system of claim 17, wherein the flow congestion management module is further configured to:

dynamically modify the blocking threshold responsive to the measured rate.

25. The system of claim 17, wherein the flow congestion management module is further configured to:

determine that a measured rate associated with the unblocked active flows of the group is less than an unblocking threshold; and select, responsive to the unblocking threshold determination, blocked flows of the group to be unblocked using unblocking criteria.

26. The system of claim 25 wherein the flow congestion management module, in selecting flows to be unblocked using unblocking criteria, is configured to:

prefer flows for unblocking that have been in a blocked state for a longer duration than a remainder of flows of the group in the blocked state.

27. The system of claim 17, wherein the flow congestion management module is further configured to:

increasing the blocking threshold responsive to the selection of flows to be blocked.

28. A device for flow congestion management comprising:

means for receiving a plurality of packets, the plurality of packets including packet fields;

means for identifying a plurality of active flows from the received plurality of packets, each active flow associated with a flow profile comprising a plurality of the packet fields, wherein at least a first active flow is dynamically generated based on determining that packet fields of at least one packet of the plurality of packets do not correspond with flow profiles of existing active flows, the first active flow associated with a first flow profile comprising a first subset of the packet fields, and wherein at least a second flow profile associated with a second active flow comprises a second subset of the packet fields different than the first subset of packet fields;

means for identifying a group of active flows from the plurality of active flows based on the flow profiles, the group of active flows including the first active flow and the second active flow;

means for determining that a measured rate associated with the group of active flows exceeds a blocking threshold;

means for selecting, responsive to the threshold determination, flows to be blocked of the group of active flows using a blocking criteria, the flows to be blocked including the first active flow;

means for discarding packets of the blocked flows; and means for forwarding packets of the second active flow for transmission.

* * * * *